United States Patent [19]

Wessel

[11] Patent Number: 4,482,823
[45] Date of Patent: Nov. 13, 1984

[54] RPM-TO-VOLTAGE CONVERTER

[75] Inventor: Wolf Wessel, Oberriexingen, Fed. Rep. of Germany

[73] Assignee: Robert Bosch GmbH, Stuttgart, Fed. Rep. of Germany

[21] Appl. No.: 377,488

[22] Filed: May 12, 1982

[30] Foreign Application Priority Data

May 19, 1981 [DE] Fed. Rep. of Germany ....... 3119820

[51] Int. Cl.³ .......................... H03K 4/04; H03K 9/06; H03K 11/00
[52] U.S. Cl. ...................................... 307/519; 307/228
[58] Field of Search ........................ 307/519, 494, 228

[56] References Cited

U.S. PATENT DOCUMENTS 3,302,110  1/1967  Hopengarten ...................... 307/519
3,689,778  9/1972  Sharp .................................. 307/519
3,732,437  5/1973  Sharp .................................. 307/519
4,056,735 11/1977  Caswell .............................. 307/494

Primary Examiner—John S. Heyman
Attorney, Agent, or Firm—Edwin E. Greigg

[57] ABSTRACT

An rpm-to-voltage converter for use in vehicles, in which the converter evaluates the time period between two sequential rpm pulses. This is accomplished by means of a capacitor loading and unloading in an approximately hyperbolic course, so that the inversely proportional relationship between the frequency and the period duration is evaluated for the frequency-to-voltage conversion. The primary characteristics of the converter are a capacitor which can be periodically loaded and unloaded, the exponential voltage course of which during the loading phase is followed by means of an emitter follower, and at the end of the loading procedure the voltage value proportional to the rpm is stored in a memory device.

1 Claim, 4 Drawing Figures

RPM-TO-VOLTAGE CONVERTER

BACKGROUND OF THE INVENTION

The invention relates generally to an rpm-to-voltage converter, and, more particularly, to an rpm-to-voltage converter for use in the open- or closed-loop control of operating characteristics of an internal combustion engine and a vehicle equipped therewith.

In the field of motor vehicles, the detection and processing of rpm pulses is of great significance. In addition to its importance in engine control, for instance for fuel metering and computing the instant of ignition, the detection of rpm is also necessary in anti-wheel-lock systems as well. The purpose then is to obtain a signal relating to the actual rpm as rapidly as possible.

Present-day rpm/voltage converters function with a monostable multivibrator, for instance, which is triggered in the rhythm of the rpm signals as they appear, and an analog value for the rpm is then produced by averaging the signals of constant duration as they appear.

A digital rpm/voltage converter is also already known, from German Offenlegungsschrift No. 23 36 015. In this known converter, the concept that the period duration of a pulse train is inversely proportional to its frequency is applied. If a counter is therefore caused to count downward from a high value in accordance with a hyperbolic function, and if this counting process is terminated at the onset of a new period, then the counter state is proportional to the frequency. It is illuminating that the converter product is all the more precise, the better the hyperbolic function of the downward-counting process is replicated. This, in turn, requires a non-inconsiderable expenditure for circuitry, so that for many applications, the known rpm/voltage converter (or more precisely, a frequency/binary digit converter) is too expensive.

OBJECT AND SUMMARY OF THE INVENTION

The rpm/voltage converter according to the invention has the advantage over the prior art in that it is relatively simple in structure and therefore favorable in cost, yet it still provides satisfactory results for many applications.

The rpm/voltage converter includes a resistor-capacitor network, including a capacitor, a network output, and a resistor connected in series across a direct voltage source. The capacitor is discharged for a predetermined discharging period of time after each rpm pulse, and is changed in the time interval between the discharging periods so to produce an output voltage during recharging which varies in an approximately hyperbolic course, from an initial maximum value corresponding to a maximum expected rpm to a final minimum value corresponding to the actual rpm as indicated by the period of the rpm pulses. An emitter follower circuit is used to monitor the capcitor-resistor network output voltage during charging of the capacitor. At the end of each capacitor charging period, the network output voltage proportional to the rpm is stored in a memory element, such as a second capacitor.

The invention will be better understood and further objects and advantages thereof will become more apparent from the ensuing detailed description of preferred embodiments taken in conjunction with the drawings.

DESCRIPTION OF THE PREFERRED EMBODIMENT

Figure 1:
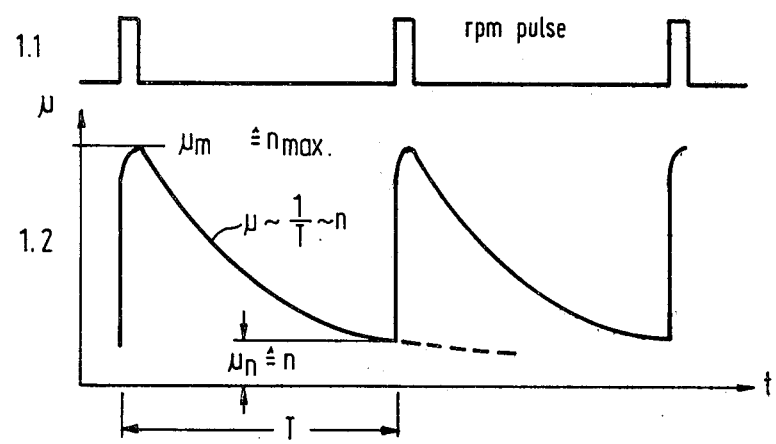
FIG. 1 includes pulse diagrams (voltage v. time) showing the fundamental mode of operation of the rpm/voltage converter according to the invention.

The exemplary embodiment relates to an rpm/voltage converter for an application in open-loop control of an internal combustion engine. FIG. 1.1 shows rpm pulses such as may be picked up by a pulse former circuit for further processing. FIG. 1.2 shows the operating principle of the rpm/voltage converter. It can be seen that there is a periodic signal increase to a maximum voltage level $\mu_m$, which is intended to represent the maximum detectable rpm value $n_{max}$. Following each signal increase is a voltage drop, which to the greatest possible extent is hyperbolic in form and whose course is $1/T$; that is, it is supposed to occur in proportion to the frequency. At the end of one period duration T, the voltage level at that time is proportional to the predetermined rpm value.

Although the most precise possible result requires a hyperbolic voltage course, still it has frequently been found in practice that an exponential voltage course is sufficiently precise. Such exponential voltage courses are well known to be relatively easy to obtain by means of resistor-capacitor combinations.

Figure 2:
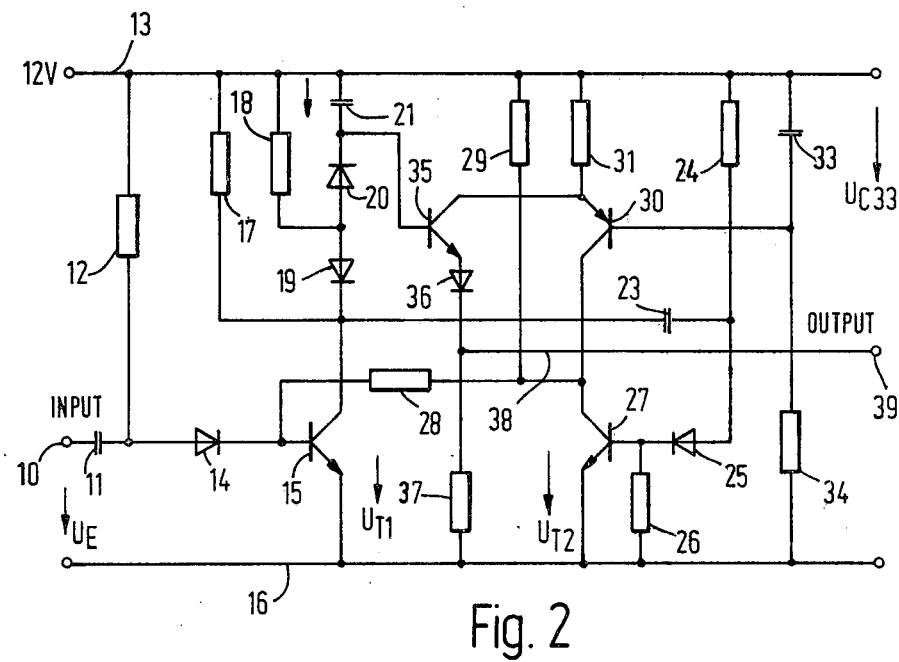
FIG. 2 is a circuit diagram for the rpm/voltage converter.

FIG. 2 shows one exemplary embodiment of the rpm/voltage converter according to the invention.

An input terminal 10 is followed by a capacitor 11, which is coupled in turn via a resistor 12 to a positive line 13 and via a diode 14 with the base of a first transistor 15. on the emitter side, this transistor 15 is connected to a ground line 16, while the collector is coupled via a resistor 17 with the positive line 13. This resistor 17 is bypassed by a series circuit comprising a resistor 18 and a diode 19, and the resistor 18 connected to the positive line is bypassed in turn by a series circuit comprising a diode 20 and a capacitor 21. From the collector of the transistor 15, and capacitor 23 also leads to a resistor 24 connected to the positive line and to a diode 25, the cathode of which is coupled via a resistor 26 with the ground line 16 and with the base of a transistor 27. This transistor 27 also is connected on the emitter side to the ground line 16, while its collector is connected via a resistor 28 to the base of the transistor 15, via a resistor 29 with the positive line 13 and via a series circuit comprising the collector-emitter path of a transistor 30 and a resistor 31 with the positive line 13. The base of the transistor 30 is connected first via a capacitor 33 with the positive line 13 and second via a resistor 34 with the negative line 16. The collector of a further transistor 35 is connected to the junction point of the transistor 30 and the resistor 31. Its emitter leads via a diode 36 and a resistor 37 to the ground line 16, and a line 38 leads from the junction point of the diode 36 and the resistor 37 to an output terminal 39. Finally, the base of the transistor 35 is also connected to the junction point of the diode 20 and capacitor 21.

Figure 3:
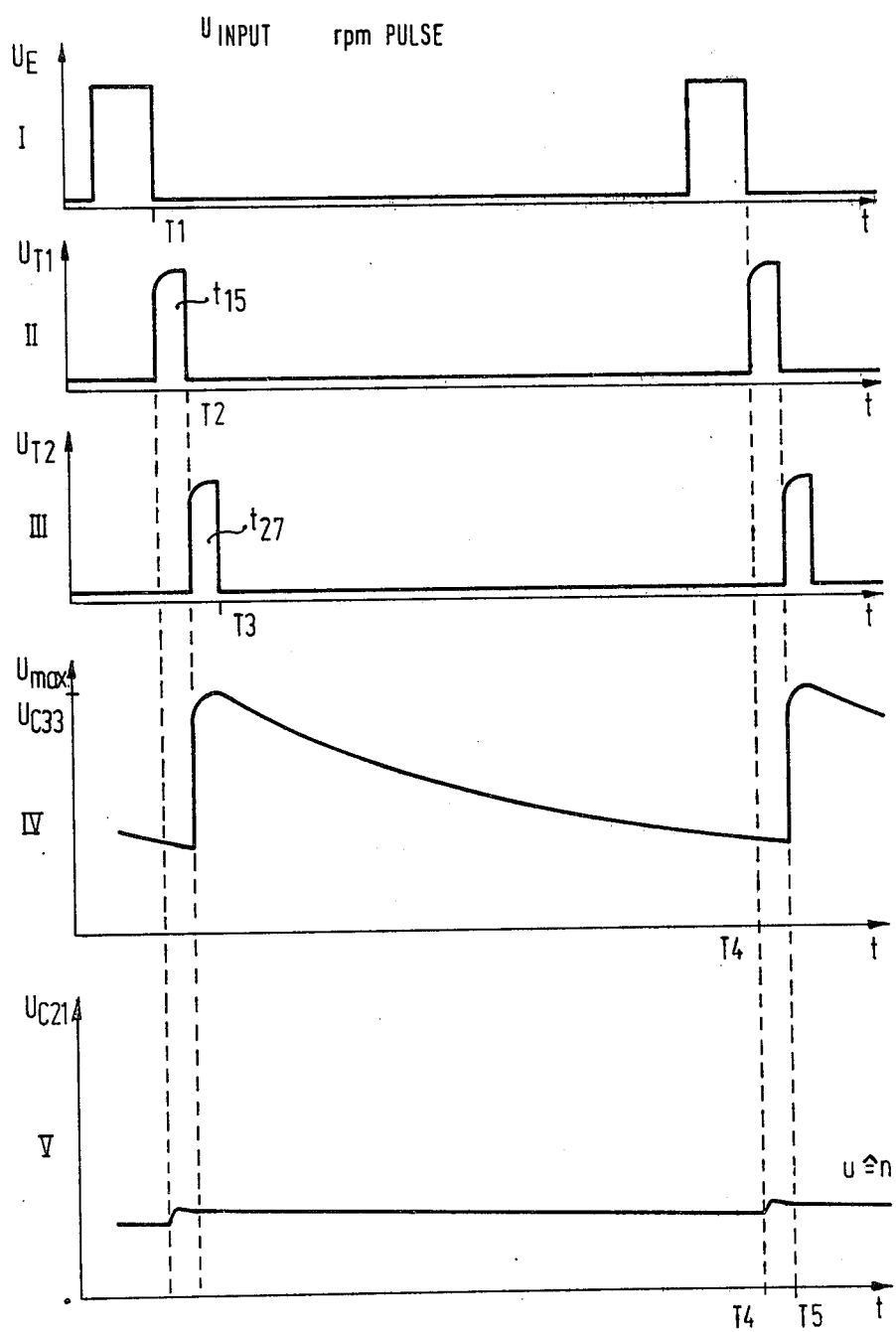
FIG. 3 provides pulse diagrams for explaining the mode of operation in greater detail.

The circuit layout of FIG. 2 will efficaciously be explained with the aid of the pulse diagrams of FIG. 3.

At the input terminal 10 there are rpm pulses, the trailing edges of which first trigger the first timing element, comprising capacitor 11, resistor 12 and transistor 15; at the collector of the transistor 15, a positive pulse of duration t15 runs its course (see FIG. 3 II). The trailing edge of this timing element signal in turn effects a triggering of the subsequent timing element comprising the capacitor 23, the resistor 24 and the transistor 27, having a duration t27. During this period t27, the transistor 27 is blocked, and the capacitor 33 assumes a high potential at its end remote from the positive line 13. This happens via a flow of current through the resistor 29 and the collector-base diode of the transistor 30 as well as through the resistor 31 and the emitter-base diode of transistor 30. After the elapse of the duration t27 shown in FIG. 3 III, the transistor 27 again becomes conductive. As a result, the transistor 30 again functions as a transistor and acts as an emitter follower for the course of voltage across the capacitor 33. A charging process of the capacitor 33 in the negative direction now occurs in accordance with an exponential function via the resistor 34. At time T5, this voltage course has attained a value which, because of the exponential function in place of the hyperbolic function, sufficiently precisely corresponds to the instantaneous rpm. The capacitor 21 may however be charged toward positive via the resistor 18 and the diode 20, which had until then been blocked, until such a point that the collector-base-diode of the transistor 35 becomes conductive, and the voltage at the capacitor 21 brackets the value which is present at the transistor 30 and corresponds to the instantaneous voltage value at the capacitor 33. This is shown in FIG. 3 V.

At time T5 or T2, the transistor 15 again becomes conductive; the diode 20 blocks, and the voltage value corresponding to the voltage across the capacitor 33 at time T5 and thus to the instantaneous rpm is stored in capacitor 21. The voltage across the capacitor 21 is called up by the transistor 35, which is now functioning as an emitter follower, and is available at all times at this transistor's emitter in the form of an rpm-proportional voltage.

Diode 36 serves the sole purpose of temperature compensation, and the resistor 28 serves the purpose of rapid switchover of the transistor 15.

Thus a voltage is present at the output terminal 39 of the circuit layout of FIG. 2 which is capable in the most rapid possible manner of following any changes in frequency whatever as they occur, because only a single period duration is ever required for detecting the rpm.

The voltage at C21 then also follows $U_{c33}$, if $U_{c33}$ drops below $U_{c21}$, which occurs in the event of rpm reduction. This is true even without triggering, which of course occurs only upon the next subsequent rpm pulse. The advantage is that a drop in rpm is recognized rapidly.

Figure 4:
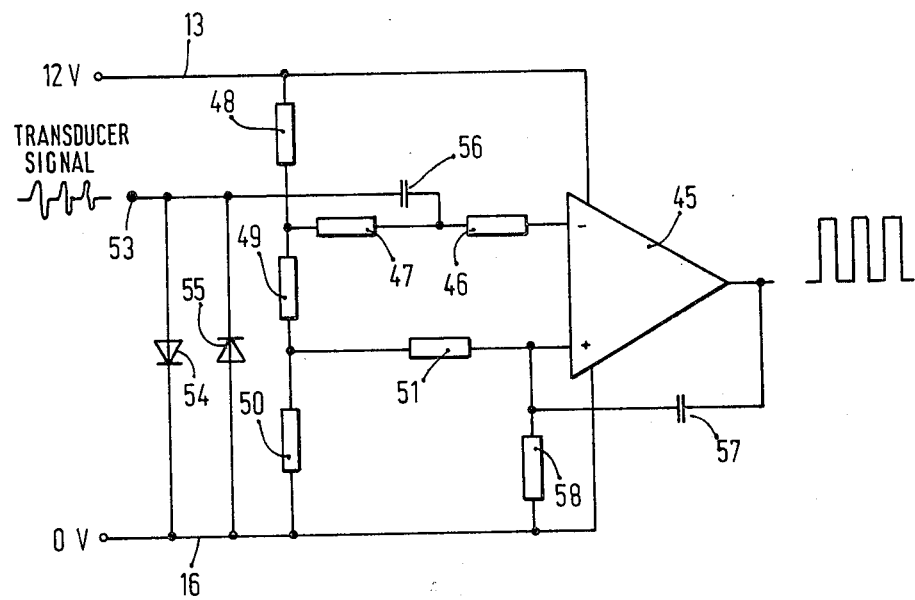
FIG. 4 shows one example of an input circuit for the converter.

FIG. 4 shows an advantageous pulse former circuit, which is efficaciously disposed preceding the circuit layout of FIG. 2, so as to attain reliable triggering of the converter every time.

This pulse former circuit substantially comprises a differential amplifier 45, the negative input of which is connected via a series circuit of two resistors 46 and 47 with a first connection point of a two-stage voltage divider comprising the resistors 48, 49 and 50 between the positive line and the negative line; its positive input is connected via a resistor 51 to the second connection point of the voltage divider 48, 49, 50. The input signals are present at an input terminal 53; they are limited in their amplitude by means of two diodes 54 and 55 switched in parallel to one another and are fed via a capacitor 56 to the junction point of the two resistors 47 and 46. Finally, there is also a positive feedback circuit, comprising a feedback capacitor 57 at the differential amplifier 45 and a resistor 58, from the positive input of the amplifier 45 to the ground line 16. On the output side, the amplifier 45 is coupled with an output terminal 60, which may be connected directly with the input terminal 10 of the circuit layout of FIG. 2.

The signals from any arbitrary rpm transducer reach the input terminal 53 and from there pass via the capacitor 56 to the negative input of the amplifier 45. The negative half-wave of the transducer signal switches over the amplifier 45, which is functioning as a comparator; this triggers a time function via the capacitor feedback, so that positive pulses of a predetermined minimum duration appear at the output of the amplifier 45. These pulses, given an appropriate dimensioning of the timing element, are embodied such that they suffice for the complete reloading of the input capacitor 11 of the circuit layout of FIG. 2.

The above-described circuit layouts, despite their relatively simple structure, are distinguished by their surprisingly precise functioning, which suits them above all for high-quantity mass production. In terms of their technical exploitation, it has proved to be particularly advantageous that when the rpm drops, there is no need to wait for the next subsequent trigger pulse; instead, the output voltage already changes as soon as the period duration corresponding to the old rpm is exceeded.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An rpm-to-voltage converter for controlling an internal combustion engine having an rpm pulse generating means which comprises:

a direct voltage source;

a capacitor-resistor network connected across the direct voltage source, including a capacitor, an ouput, and a resistor connected in series arrangement, the capacitance and resistance values of the capacitor-resistor network being selected so that between successive rpm pulses, the output voltage of the capacitor-resistor network varies along a voltage-time curve which approximates a hyperbola;

an emitter follower circuit means for detecting and following the output voltage of the capacitor-resistor network;

at least one timing circuit means activated by rpm pulses having a frequency proportional to rpm, including a capacitor discharge timing circuit means for discharging said capacitor during a predetermined capacitor discharging period following each rpm pulse; and memory means for storing the most recent occurring final output voltage value of the capacitor-resistor network following each rpm impulse and before said discharging of said capacitor, wherein a new capacitor charging occurs after said most recent output voltage is stored by said storage means.

* * * * *